United States Patent [19]
Blasius et al.

[11] Patent Number: 4,639,727
[45] Date of Patent: Jan. 27, 1987

[54] DATA TRANSMISSION SYSTEM OF OPTTO-COUPLERS

[75] Inventors: Udo Blasius; Anton Rodi, both of Leimen, Fed. Rep. of Germany

[73] Assignee: Heidelberger Druckmaschinen AG, Heidelberg, Fed. Rep. of Germany

[21] Appl. No.: 752,481

[22] Filed: Jul. 3, 1985

Related U.S. Application Data

[63] Continuation of Ser. No. 483,661, Apr. 11, 1983, abandoned.

[30] Foreign Application Priority Data

Apr. 10, 1982 [DE] Fed. Rep. of Germany ....... 3213527

[51] Int. Cl.⁴ .............................................. H04Q 1/00
[52] U.S. Cl. .......................... 340/825.57; 340/825.82; 455/601; 307/311
[58] Field of Search ............... 455/600, 601, 602, 607, 455/613, 612; 370/11; 307/150, 311, 117; 340/825.57, 825.82; 375/36

[56] References Cited

U.S. PATENT DOCUMENTS

| 4,161,650 | 7/1979 | Caouette et al. | 307/150 |
| 4,176,401 | 11/1979 | Lonberger | 455/613 |
| 4,233,589 | 11/1980 | Rawson et al. | 455/612 |
| 4,363,121 | 12/1982 | Schlyter | 370/11 |
| 4,420,841 | 12/1983 | Dudash | 455/602 |
| 4,596,984 | 6/1986 | Egami | 340/825.82 |

*Primary Examiner*—Donald J. Yusko
*Attorney, Agent, or Firm*—Herbert L. Lerner; Laurence A. Greenberg

[57] ABSTRACT

A data transmission system having a plurality of devices mutually connected by electric lines affording data transmission therebetween in both directions, the devices having at least one data output and a data input separated from the data output, including an optocoupler and an electrical receiving unit contained in at least one of the devices, the optocoupler having an input connected to the data input of the one device, and having an output connected to the electrical receiving unit of the one device.

6 Claims, 1 Drawing Figure

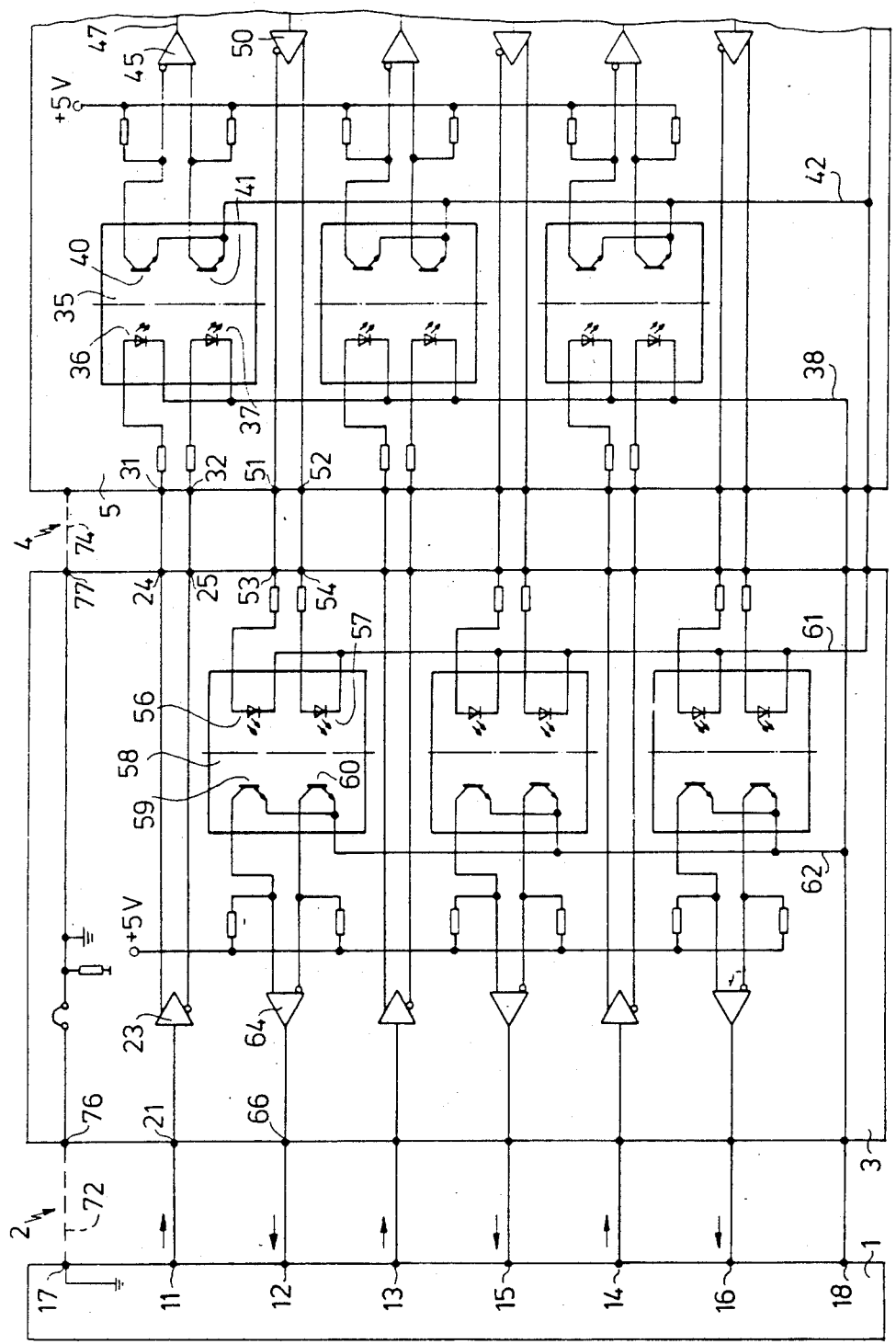

DATA TRANSMISSION SYSTEM OF OPTTO-COUPLERS

This application is a continuation of application Ser. No. 483,661, filed Apr. 11, 1983 now abandoned.

BACKGROUND OF THE INVENTION

The invention relates to a data transmission system having several devices connected to one another by electrical lines, data transmission being possible in both directions between the devices which have at least one data output and one data input separated from the data output.

Systems of this type may be pure data transmission systems or also, however, data processing systems. Because the levels of the digital signals are defined for systems of this type, measures must be taken to ensure that when devices of the data transmission system which are spatially separated from one another are connected by means of electrical lines or cables, all devices connected to one another are at the same ground potential. The satisfaction of this requirement is occasionally difficult, so that a risk of interference in the data transmission arises. It is accordingly an object of the invention to provide such a data transmission system with relatively simple means which avoid such interference.

SUMMARY OF THE INVENTION

With the foregoing and other objects in view, there is provided, in accordance with the invention, a data transmission system having a plurality of devices mutually connected by electric lines affording data transmission therebetween in both directions, the devices having at least one data output and a data input separated from the data output, comprising an optocoupler and an electrical receiving unit contained in at least one of the devices, the optocoupler having an input connected to the data input of the one device, and having an output connected to the electrical receiving unit of the one device.

If the aforementioned device has several data inputs, all of the inputs are equipped with optocouplers. (An exception applies to adapters, which may have additional data inputs, which are not constructed in accordance with the invention). The data output of the device is connected directly to the electrical output circuit of the device, generally to the output of a driver amplifier.

An advantage of the invention is that the mutually connected devices are completely electrically isolated or decoupled from one another. The potential separation makes it possible for the ground potential of the various devices to differ from one another without causing a risk of interference. Moreover, the electrical properties of the optocoupler's data input are matched or adapted, without difficulty, to the characteristics of the data output, which is connected to the optocoupler by the electrical line, so that the data input of the optocoupler behaves electrically exactly like a conventional data input i.e. it has somewhat the characteristics of the standard RS-232 or RS-422. An additional advantage is that the power supply for the optocoupler, which the optocoupler requires in order to supply the light receiver contained therein and an amplifying circuit connected to the light receiver, can be removed from the device wherein the octocoupler is installed so that a special additional expense, for example, for a power supply located outside the devices, is avoided. If one should wish to isolate the devices electrically by inserting between the aforementioned devices an adapter with optocouplers which electrically isolate all of the data paths by means of the optocouplers, a separate power supply for the adapter would have to be provided so that the output signals of the optocouplers can be brought, for example, to the levels specified by the aforementioned standard. A further advantage is that the interference immunity factor increases considerably with minimum expense because crosstalk of signals between data-input and data-output lines is reduced.

The aforementioned devices may be separated from one another spatially, however, they may also be disposed at a close distance next to one another, or one of the devices may be installed within another of the devices within the scope of the invention.

For the invention as described hereinbefore, it was assumed that there is no conductive shielding of the electrical lines. The invention is also realizable, however, for such data transmission systems, wherein the electric lines are shielded. Consequently, in accordance with another feature of the invention, there is provided, a data transmission system having a plurality of devices mutually connected by electric lines affording data transmission therebetween in both directions, the device having at least one data output and a data input separated from the data output comprising an optocoupler and an electrical reciving unit forming at least part of one of the devices, the optocoupler having an input connected to the data input of the one device, and having an output connected to the electrical receiving unit of the one device, the electric line connecting a pair of the devices having a shielding, connected only to equipment ground of a single device of the pair of devices.

An advantage derived from this construction is that the shielding of the lines or cables does not effect any conductive connection between the two devices connected to one another so that the two mutually connected devices may be at different ground potentials.

The just-described construction according to the invention may, for example, be implemented as follows: If lines or cables are used which are provided at both ends with a plug connector, the shielding of the line or the cable is not connected to that terminal of the plug connector which is used for the connection to the respective equipment ground. Therefore, specially constructed connecting cables must be provided which differ from the connecting cables or connecting lines of conventional data transmission systems for which the shielding is connected-through.

In accordance with an additional feature of the invention the electrical lines comprise shielded cables isolated from one another for the data transmission between the device of a respective pair thereof, the cables having shielding connected to the equipment ground only at an end of the cables which is connected to the data output of the device of the respective pair of devices connected to the cables.

In accordance with an alternate feature of the invention, the electric lines comprise shielded cables isolated from one another for the data transmission between the devices of a respective pair thereof, the cables having shielding connected to the equipment ground only at an end of the cables which is connected to the data input of the device of the respective pair of devices connected to the cables.

Also in the case of the last-mentioned constructions, specially provided connecting cables may be used according to the invention. Care must be taken that the cables are arranged properly when the cables are connected.

If, however, the plug connectors provided at the devices and connectible by means of the cables are so connected, according to one embodiment of the invention, that for the connection of a cable to these plug connectors the cable shielding is connected uniformly for the entire system only to the equipment ground of that device which for one embodiment is located at the data-input end of the relevant cable and for the other embodiment, at the data-output end of the cable, conventional cables may then be used i.e. cables for which the shielding at both ends of the cable is connected to the associated terminals of the plug connector disposed at the cable end. This facilitates the use of finished or prefabricated cables complete with plugs or sockets at the ends thereof, and readily available in the trade, for the system according to the invention.

An adapter with a power supply which, on the one side, has data inputs and/or data outputs which are constructed in a conventional manner and are to be connected to a conventional device of a data transmission system, for example, a computer known in the trade, and which, on the other side, has data outputs and data inputs, which are constructed according to the invention, is also understood to be a device of a data processing system which may be constructed in accordance with the invention. Such adapters serve to adapt conventional devices known in the trade which have no electrical signal isolation and/or have differing interface standards (for example, RS-232 and RS-422).

In the event that, in addition to the aforementioned data inputs and data outputs, the devices of the data transmission system have further inputs and outputs as well, for example, for control signals, these last-mentioned inputs and outputs are also to be constructed in the aforedescribed manner according to the invention; the initially designated "data" are thus also generally supposed to include all electrical quantities to be transmitted.

The same consideration applies by analogy if the cables contain (also in addition to an existing shielding, if necessary or desirable,) a conductor which is used with conventional data transmission systems for connecting the equipment ground of two devices which are connected to one another by the cables. In this case, too, care should be taken that this conductor does not, in fact, form any conductive connection between the equipment grounds of two devices connected to one another; in particular, provision may also be made for that contact of a plug connector which is provided at the device for connection to this aforementioned conductor, not to be itself connected within the device.

Other features which are considered as characteristic for the invention are set forth in the appended claims.

Although the invention is illustrated and described herein as embodied in a data transmission system, it is nevertheless not intended to be limited to the details shown, since various modifications and structural changes may be made therein without departing from the spirit of the invention and within the scope and range of equivalents of the claims.

BRIEF DESCRIPTION OF DRAWING

The construction and method of operation of the invention, however, together with additional objects and advantages thereof will be best understood from the following description of specific embodiments when read in connection with the single FIGURE of the drawing which is a circuit diagram of a data transmission system according to the invention, which has a microcomputer (personal computer), an adapter and another device for acquiring and processing data.

DESCRIPTION OF THE PREFERRED EMBODIMENTS

Referring now to the FIGURE of the drawing, there is shown a data transmission system according to the invention which includes a personal computer or microcomputer 1, which is connected via a cable 2 with an adapter 3 which, in turn, is connected via a cable 4 to an electronic control device 5, of which there is shown in the FIGURE of the drawing only that portion which is in vicinity of the inputs and outputs thereof which are connected to the adapter 3. The microcomputer 1 has a single-ended data output 11 and a single-ended data input 12 as well as single-ended outputs 13 and 14 for control signals and single-ended data inputs 15 and 16 for control signals. In addition, a terminal 17 is provided which is at protective ground potential and, thus, is also connected to the metal housing of the microcomputer 1 amongst others, as well as a terminal 18 with the designation "signal ground".

The adapter 3 has three pairs of signal paths, all of the pairs being similar to one another; it is therefore believed to be sufficient to describe only one of the pairs. A data input 21, which is connected to the microcomputer 1 via the cable 2 and receives a single-ended signal, is further connected to an amplifier 23 ("data sender") having two outputs at which a push-pull signal appears and is conducted to outputs 24 and 25 of the adapter 3. From there, the push-pull signal is conducted via two leads of the cable 4 to data inputs 31 and 32 of the device 5. From the input 31 of the device 5, the electrical signals travel via a protective resistor to a terminal of an LED 36 disposed in an optocoupler 35, the LED 36 having another terminal connected to a line 38 common to all of the optocouplers in the device 5. The input 32 leads via a protective resistor to an LED 37 in the same optocoupler 35, the LED 37 having another terminal which, in turn is connected to the line 38. The LED's 36 and 37 are coupled optically in a conventional manner to phototransistors 40 and 41, emitters of which as well as of the other phototransistors in the remaining optocouplers being connected to a common line 42. The phototransistors 40 and 41 of the optocoupler 35 have collectors which are connected to an inverting or non-inverting input, as the case may be, of an operational amplifier 45, which has an output at which the amplified output signal, which is assigned to the signal leaving the data output 11 of the microcomputer 1, is available via a line 47.

In the reverse direction, data from the non-illustrated part of the device 5 arrive at an input of an amplifier 50 in the device 5. The amplifier 50 has an inverting output and a non-inverting output, which are connected to data outputs 51 and 52 of the device 5, and from there the data travel via two leads of the cable 4 to data inputs 53 and 54, which are connected in fully the same manner as described hereinabove for the optocoupler 35 in the device 5, to LED's 56 and 57 of an optocoupler 58, which is of the same construction as that of the optocoupler 35. Phototransistors 59 and 60 of this optocoupler 58 are connected, in a manner fully corresponding to that of the circuit described hereinabove for the optocoupler 35, to a line 62 common to all emitters of the respective phototransistors provided in the adapter 3, on the one hand and, on the other hand, to an inverting and a non-inverting input of an operational amplifier 64 having an output which is connected to a data output 66 of the adapter 3, the data output 66 being connected via a lead of the cable 2 to the data input 12 of the microcomputer 1.

The LED's 56 and 57 and the remaining LED's of the optocouplers in the adapter 3 have cathodes which are connected to a common line 61.

Transmission of the device 5 of the control signals originating from the outputs 13 and 14 of the microcomputer 1, and transmission of the control signals originating from the device 5 to the control signal inputs 15 and 16 of the microcomputer 1 occur in the same manner just described.

The line 38 of the device 5 is connected to the line 62 of the adapter 3 via a lead of the cable 4, and the line 62 is connected via a lead of the cable 2 to the terminal 18 (signal ground) of the microcomputer 1. The potential of this signal ground lies mid-way between the potentials of the signals which occur at the two outputs of the amplifier 23 and the other amplifiers corresponding to the latter at the inputs of the adapter 3.

In a similar manner, the line 61 of the adapter 3 is connected to the line 42 of the device 5 via a lead of the cable 4, and the line 42 is connected to the signal ground of the device 5 in a manner not illustrated in the drawing.

Due to the presence of a potential "signal ground" and due to the connection of the cathode of each of the two LED's 36 and 37 in the optocouplers 35 of the device 5, the push-pull signal appearing at the inputs 31 and 32 is interpreted or evaluated as if it were two single-ended signals in phase opposition. This has the advantage of providing immunity against interference.

The foregoing also applies, of course, to the transmission of data and control signals in reverse direction.

The cables 2 and 4, respectively, have a shielding, which is shown only symbolically or diagrammatically in the drawing by means of a line 72 in the case of the cable 2 and a line 74 in the case of the cable 4. In regard to the microcomputer 1, the shielding 72 is connected to the terminal 17 and, in regard to the adapter 3, to a terminal 76, from which the line 72 extends to a terminal 77 connected to the shielding 74 of the cable 4. Within the adapter 3, the terminals 76 and 77 are connected in the manner indicated to the equipment ground. The shielding 74 of the cable 4, to be sure, extends to a contact of a multiple plug connector (not shown in the drawing) in the device 5, but this contact is not connected in the device 5 itself. There is therefore a complete potential isolation between the device 5 and the adapter 3. Data is transmitted over the cable 2 in accordance with the standard RS-232, and over the cable 4, in accordance with the standard RS-422. As a result, two levels of +12 V and −12 V (single-ended signals) are present in the leads of the cable 2, and differential voltages in the range between 2 V and 6 V, in the leads of the cable 4, which conducts push-pull signals. Signal levels of +5 V and 0 V are present at the electrical outputs of the optocouplers i.e. at the input of the amplifier 45 or 64, for example. In the adapter 3 and in the device 5, a terminal is additionally provided, respectively, to which a voltage of +5 V is applied, respectively, which supplies the power for the relevant subassembly 3 and 5, respectively.

The foregoing is a description corresponding in substance to German Application P No. 32 13 527.0, dated Apr. 10, 1982, the International priority of which is being claimed for the instant application, and which is hereby made part of this application. Any material discrepancies between the foregoing specification and the aforementioned corresponding German application are to be resolved in favor of the latter.

We claim:

1. Data transmission system having at least two spatially separated devices mutually connected by electric lines affording data transmission therebetween in both directions, the devices each having at least one data output and a data input separated from the data output, comprising an optocoupler and an electrical receiving unit included in at least one of the devices, said optocoupler having an input connected to the data input of said one device, and having an output connected to said electrical receiving unit of said one device, the data inputs and the data outputs of each of said spatially separated devices being insulated from one another and the data outputs of one of the spatially separated devices being connected with the respective data inputs of another one of the devices, and being similarly connected in the opposite direction.

2. Data transmission system having at least two spatially separated devices mutually connected by electric lines affording data transmission therebetween in both directions, the devices each having at least one data output and a data input separated from the data output, comprising an optocoupler and an electrical receiving unit included in at least part of the devices, said optocoupler having an input connected to the data input of said one device, and having an output connected to said electrical receiving unit of said one device, the data inputs and the data outputs of each of said spatially separated devices being insulated from one another and the data outputs of one of the spatially separated devices being connected with the respective data inputs of another one of the devices, and being similarly connected in the opposite direction, the electric line connecting a pair of devices having a shielding connected only to equipment ground of a single one of said spatially separated devices.

3. Data transmission system according to claim 2 wherein the electric lines comprise shielded cables isolated from one another for the data transmission between the spatially separate devices of a respective pair thereof, said cables having shielding connected to said equipment ground only at an end of said cables which is connected to the data output of the device of the respective pair of spatially separate devices connected to said cables.

4. Data transmission system according to claim 2 wherein the electric lines comprise shielded cables isolated from one another for the data transmission between the spatially separate devices of a respective pair thereof, said cables having shielding connected to said equipment ground only at an end of said cables which is connected to the data input of the device of the respective pair of spatially separate devices connected to said cables.

5. Data transmission system according to claim 1 further comprising at least one device disposed at a close distance to a respective one of said spatially separated devices and having data outputs and a data sender connected at its input to said data output, and wherein said data sender, said optocoupler and said electrical receiving unit connected to said data sender operate in push-pull connection.

6. Data transmission system according to claim 2 further comprising at least one device disposed at a close distance to a respective one of said spatially separated devices and having data outputs and a data sender connected at its input to said data output, and wherein said data sender, said optocoupler and said electrical receiving unit operate in push-pull connection.

* * * * *

UNITED STATES PATENT AND TRADEMARK OFFICE
CERTIFICATE OF CORRECTION

PATENT NO. : 4,639,727
DATED : January 27, 1987
INVENTOR(S) : UDO BLASIUS and ANTON RODI It is certified that error appears in the above-identified patent and that said Letters Patent are hereby corrected as shown below:

In the heading, item (54), line 4,

"OPTTO-COUPLERS" should read --OPTO-COUPLERS".

In the heading, item (22), line 10,

"Jul. 3, 1985" should read --Jul. 5, 1985--.

In column 1, line 3,

"OPTTO-COUPLERS" should read --OPTO-COUPLERS--.

Signed and Sealed this

Ninth Day of June, 1987

Attest:

DONALD J. QUIGG

Attesting Officer

Commissioner of Patents and Trademarks